United States Patent [19]

Nicholas et al.

[11] Patent Number: 4,732,596
[45] Date of Patent: Mar. 22, 1988

[54] GAS SEPARATION PROCESS

[75] Inventors: David M. Nicholas, New Tripoli; Jeffrey A. Hopkins, Whitehall; Thomas M. Roden, Mucungie; Joseph P. Bushinsky, Emmaus, all of Pa.

[73] Assignee: Air Products and Chemicals, Inc., Allentown, Pa.

[21] Appl. No.: 43,564

[22] Filed: Apr. 28, 1987

[51] Int. Cl.$^4$ .............................................. F25J 3/02
[52] U.S. Cl. ...................................... 62/18; 55/25; 55/68; 55/74
[58] Field of Search ................ 62/9, 11, 17, 18, 38; 55/25, 66, 68, 74

[56] References Cited

U.S. PATENT DOCUMENTS

| | | | |
|---|---|---|---|
| 3,359,744 | 12/1967 | Bolez et al. | 62/36 |
| 3,838,553 | 10/1974 | Doherty | 55/58 |
| 3,986,849 | 10/1976 | Fuderer et al. | 55/25 |
| 4,171,206 | 10/1979 | Sircar | 55/26 |
| 4,194,890 | 3/1980 | McCombs et al. | 55/25 X |
| 4,375,363 | 3/1983 | Fuderer | 55/25 |
| 4,671,893 | 6/1987 | Pinto | 55/25 X |

Primary Examiner—Steven E. Warner
Attorney, Agent, or Firm—Geoffrey L. Chase; James C. Simmons; William F. Marsh

[57] ABSTRACT

Hydrogen and carbon monoxide are each separately recovered in high yield from a multicomponent gas stream containing these compounds together with carbon dioxide and a zero to minor amount of one or more gaseous components from the group consisting of nitrogen, methane, water vapor and $C_2$-$C_6$ hydrocarbons, by a process wherein the multicomponent gas stream, such as that obtained by steam methane reforming, is initially treated in a pressure swing adsorption unit to remove water and $CO_2$, and the obtained effluent freed of $CO_2$ and water is then further subjected to (1) cryogenic fractionation to condense CO and to (2) hydrogen purification by selective adsorption (in either order) to recover high purity carbon monoxide and essentially pure hydrogen. The $CO_2$-laden adsorbent is regenerated by purging with a $H_2O$ and $CO_2$-free waste gas stream from the hydrogen purification adsorbent bed or from the cryogenic fractionation or from both of these.

22 Claims, 6 Drawing Figures

GAS SEPARATION PROCESS

TECHNICAL FIELD

The present invention is concerned with gas separation processes, more particularly with operations for recovery of major individual components from gas mixtures.

BACKGROUND OF THE INVENTION

Sundry gas mixtures are available from natural sources as well as in products and by-products of known chemical processes. Various techniques have been employed or proposed for recovery of one or more individual components of such gas mixtures, including among these: adsorption in selective solvents, cryogenic fractionation, selective adsorption by solid adsorbents, and certain combinations of such unit operations.

Natural gas, for example, typically comprises in the order of from about 50 to about 95 volume percent methane, with about 4 or 5% and up to 40–50% $C_2$ to $C_6$ hydrocarbons, up to about 5 to 6% nitrogen and the remainder made up chiefly of carbon dioxide (less than about 1%) and other impurities (less than about half percent). Among known industrial uses for natural gas, other than its use as fuel, is in the production of hydrogen and other valuable products therefrom.

Among conventional processing of natural gas or other methane-rich gas mixtures is that of reforming, particularly that carried out by reaction with steam, according to the equations:

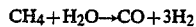

$$CH_4 + H_2O \rightarrow CO + 3H_2$$

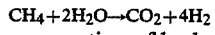

$$CH_4 + 2H_2O \rightarrow CO_2 + 4H_2$$

The separation of hydrogen from oxides of carbon in the reformate by present technology is costly from the standpoint of initial capital investment as well as operating costs incurred in the energy intensive methods employed. Conventional processes generally combine treatment of the starting mixed gas charge with a selective solvent absorbent, such as monoethanolamine (MEA), to remove the bulk of the $CO_2$ followed by cooling to cryogenic temperatures for separation of the carbon monoxide from hydrogen. Regeneration of the absorbent requires considerable energy input, which is largely obtained from process heat that would otherwise be available for generation of steam. Since small amounts of both water and $CO_2$ still remain in the process gas effluent from the absorber, it is necessary to incorporate driers in the system to prevent these species from freezing out in the gas chilling equipment (coldbox). These driers further intensify the already significant capital costs.

As illustrated in FIG. 1, the conventional "state of the art" system for separation of $H_2/CO/CO_2$ derived from steam reforming of a methane-rich gas mixture entails the use of a solvent absorbent (generally monoethanolamine) for removal of $CO_2$, a so-called "coldbox" for bulk separation of the carbon monoxide from its admixture with hydrogen, and a solid adsorbent unit (PSA) for further purification of the hydrogen. The crude hydrogen product obtained form the coldbox is about 98% pure and may be brought to about 99.9% purity in the PSA unit. The described operation typically provides about 98% hydrogen recovery, the reject gas being utilized as fuel in the reformer furnace.

PRIOR ART

U.S. Pat. No. 3,838,553 discloses separation of a light gas, such as hydrogen or helium from a mixed gas stream, employing according to one disclosed embodiment, an initial low temperature separator unit from which the separated light gas component is recovered by fractional cryogenic distillation, and purified in the pressure swing adsorber unit (PSA). The reject gas from regeneration of the PSA unit is recompressed and mixed with the feed charged to the low temperature separation unit. In accordance with an alternative embodiment disclosed in the patent, the mixed gas stream may be first charged to the PSA system, recovering the unsorbed light gas component effluent, the reject gas desorbed from the PSA bed being compressed and passed to the low temperature unit for removal of heavier contaminants, while the partially purified light gas is recycled to feed.

U.S. Pat. No. 4,171,206, assigned to the common assignee of the present patent application, describes a PSA system for separation of a multicomponent feed gas mixture for recovery therefrom of a primary key component and a secondary key component which is more strongly sorbed than the primary key component, said feed gas mixture also containing at least one minor dilute tertiary gas component that is less strongly sorbed than the secondary key component. As a particular example of starting gas mixtures the patent discloses the treatment of a shift convertor effluent gas from a hydrocarbon reformer plant, wherein hydrogen and carbon dioxide are separately recovered as key components substantially freed of minor dilute components such as methane, carbon monoxide and nitrogen. The PSA system described in the patent employs a train of adsorbent beds in series, the first of which beds is selective for sorption and retention of $CO_2$ and the second selective for sorption and retention of other dilute components present in the feed gas, while permitting unsorbed hydrogen of high purity to pass through the bed as recoverable primary effluent. The disclosed adsorbent employed in the first beds for retention of $CO_2$ is activated carbon; each of the second beds is packed with a layer of activated carbon and a layer of 5A molecular sieve zeolite.

Cryogenic separation and removal of methane and/or other hydrocarbons from a crude hydrogen stream is disclosed in U.S. Pat. No. 3,359,744. The crude stream is charged to a coldbox wherein the charge is cooled by autogenous heat exchange, whereby hydrocarbons are condensed and separated. A portion of the purified hydrogen recovered is mixed with the condensate and employed to refrigerate the incoming crude hydrogen. The required low temperature is provided by passing the condensate through a Joule-Thomson expansion device. In the described operation the crude hydrogen charge needs to be dried before introduction into the coldbox.

SUMMARY OF THE INVENTION

In accordance with the present invention, a synthesis gas stream composed chiefly of hydrogen and oxides of carbon (CO and $CO_2$), such as that obtained by steam reforming of a methane-rich gas mixture, is subjected to a novel and cost efficient separation scheme whereby high purity hydrogen and carbon monoxide are each individually recovered in high yield substantially free of carbon dioxide and other contaminant. In practice of the invention, in accordance with one embodiment thereof, water and carbon dioxide are initially removed from the feed gas stream by selective adsorption in a multi-bed adsorbent system and the unsorbed effluent (essentially freed of water and $CO_2$) is subjected to cryogenic fractionation in a coldbox, wherein carbon monoxide is condensed and recovered as a product stream of high purity (99%) providing a crude hydrogen effluent which is subjected to further purification, obtaining substantially pure hydrogen by selective adsorption therefrom of accompanying contaminant. In an alternative embodiment, the primary PSA effluent, freed of water and $CO_2$, is sent directly to a second PSA section for purification and recovery of essentially pure hydrogen, the sorbed contaminants being desorbed and cryogenically fractionated for condensation and recovery of carbon monoxide.

PRIOR ART PROBLEMS

Figure 1:
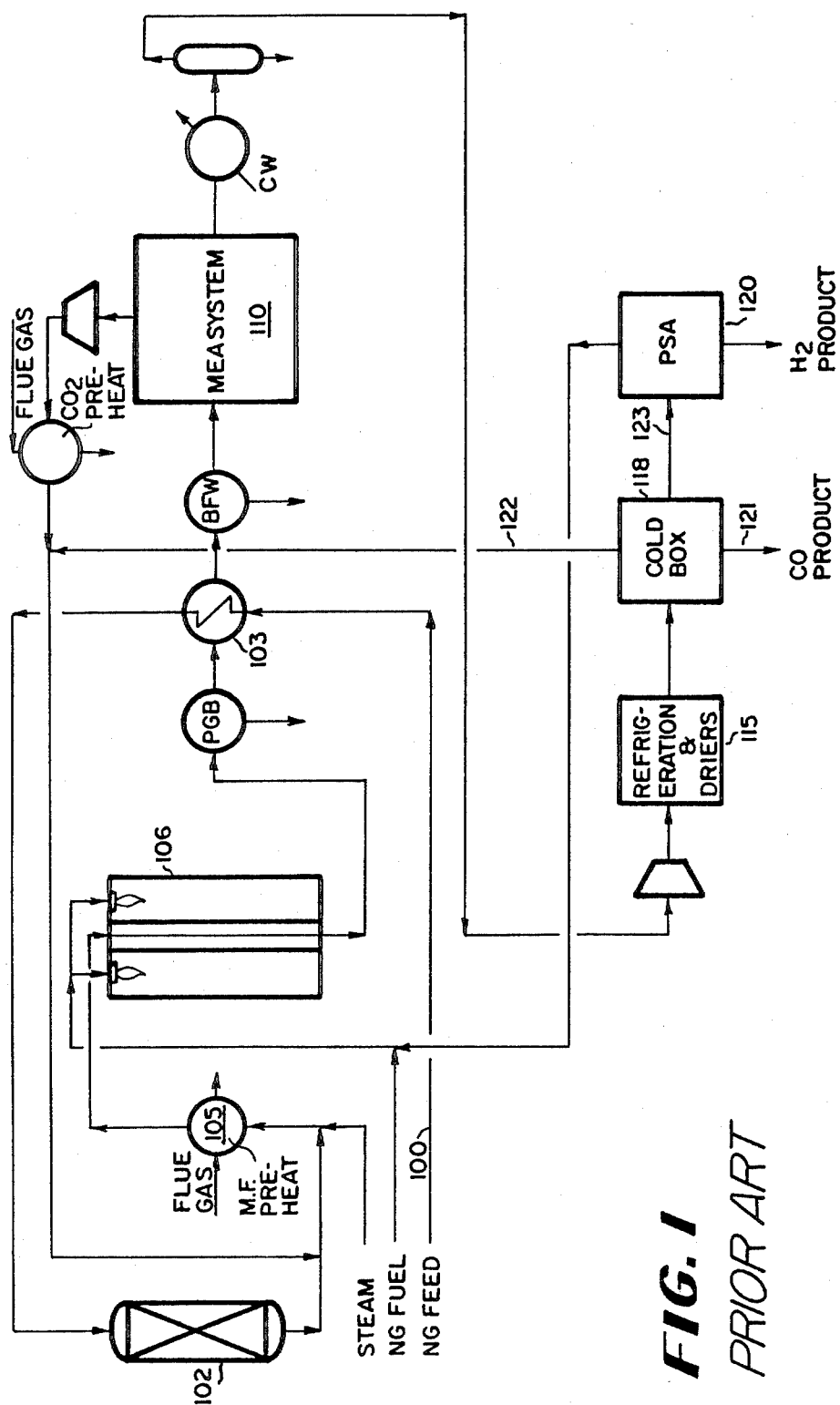
FIG. 1 of the accompanying drawings is a process flow diagram of a prior art method for individual recovery of hydrogen and carbon monoxide from a gas mixture produced in the steam reforming of natural gas.

A conventional "state of the art" system for production and recovery of hydrogen and carbon monoxide from a steam-methane reformate, as illustrated in FIG. 1, comprises principally a desulfurizing unit 102, a reforming furnace 106, a solvent extraction system 110 [monoethanolamine (MEA) absorber] for removal of $CO_2$ from the reformate, means 115 for refrigerating and drying the syngas, a coldbox unit 118 for cryogenic separation of CO and a multicolumn PSA system 120 for purifying the crude hydrogen product discharged from the coldbox. The solvent extraction unit 110 is placed in series with the coldbox 118 so as to remove the $CO_2$ prior to separation of the CO and $H_2$. A significant amount of energy is required to regenerate the MEA absorbent employed, thus utilizing energy (process heat) which otherwise could be beneficially employed to generate steam. Moreover, since small amounts of water as well as $CO_2$ still remain in the process gas effluent from the MEA absorber unit, the adsorbent driers at 115 must be employed to prevent these species from freezing out in the coldbox. The needs for the driers thus intensifies the already significant capital and operating costs of these prior art systems.

In typical operation of a prior art system, such as that illustrated in FIG. 1, the natural gas or other high methane feed 100, after being desulfurized at 102, is mixed with steam and recycle gas, preheated in heat exchanger 105 and reacted in steam-methane reformer furnace 106 fired by natural gas, typically producing an effluent having about 2.7 $H_2/CO$ mole ratio. The reformer effluent is cooled in several heat exchangers including against feed in exchanger 103, to a temperature in the order of about 140° F. and contained $CO_2$ is removed by absorption in a solvent, such as monoethanolamine (MEA) to a residual content of about 100 ppm (dry basis). Process gas discharged from the absorber is compressed, refrigerated and further dried (at 115) before entering the coldbox 118 at about 45° F. In the coldbox operation, CO and $CH_4$ are separated from hydrogen in a series of flash drums (not shown). The obtained $CO/CH_4$ stream is further cooled and introduced into a cryogenic distillation column from which the CO product of up to about 99.5% purity (121) is withdrawn overhead, while the $CO/CH_4$ "bottoms" fraction is recycled to the reformer feed (via line 122). The hydrogen product (123) exits the coldbox about 98% pure and is further purified by selective adsorption in a multicolumn PSA system 120, producing hydrogen of 99.9+ % purity. Hydrogen recovery through the PSA system is typically about 85%, with the reject being utilized as fuel for the reformer furnace.

DETAILED DESCRIPTION OF THE INVENTION

According to the present invention the separation of $H_2/CO/CO_2$ from a hydrocarbon-steam reformate or other gas mixture containing these components, is effected by a process scheme in which initial separation of $CO_2$ from the mixed gas is carried out by selective adsorption in a PSA section or unit and the separation and recovery of hydrogen and CO is effected by cryogenic fractionation in a coldbox unit, the obtained crude hydrogen stream being further purified by selective adsorption of accompanying impurities therefrom. In the preferred practice of the invention, the initial removal of $CO_2$ and the final purification of the crude hydrogen stream obtained from the coldbox are both carried out in an integrated multicolumn PSA system as hereinafter described.

Three different modifications for practice of the invention are hereinafter described. In each of these embodiments an important feature is the use of process streams free of water and $CO_2$ to efficiently purge the adsorbent beds employed in the $CO_2$-removal section of the PSA unit so that essentially no water or $CO_2$ will pass through the beds into the coldbox unit.

Figure 2:
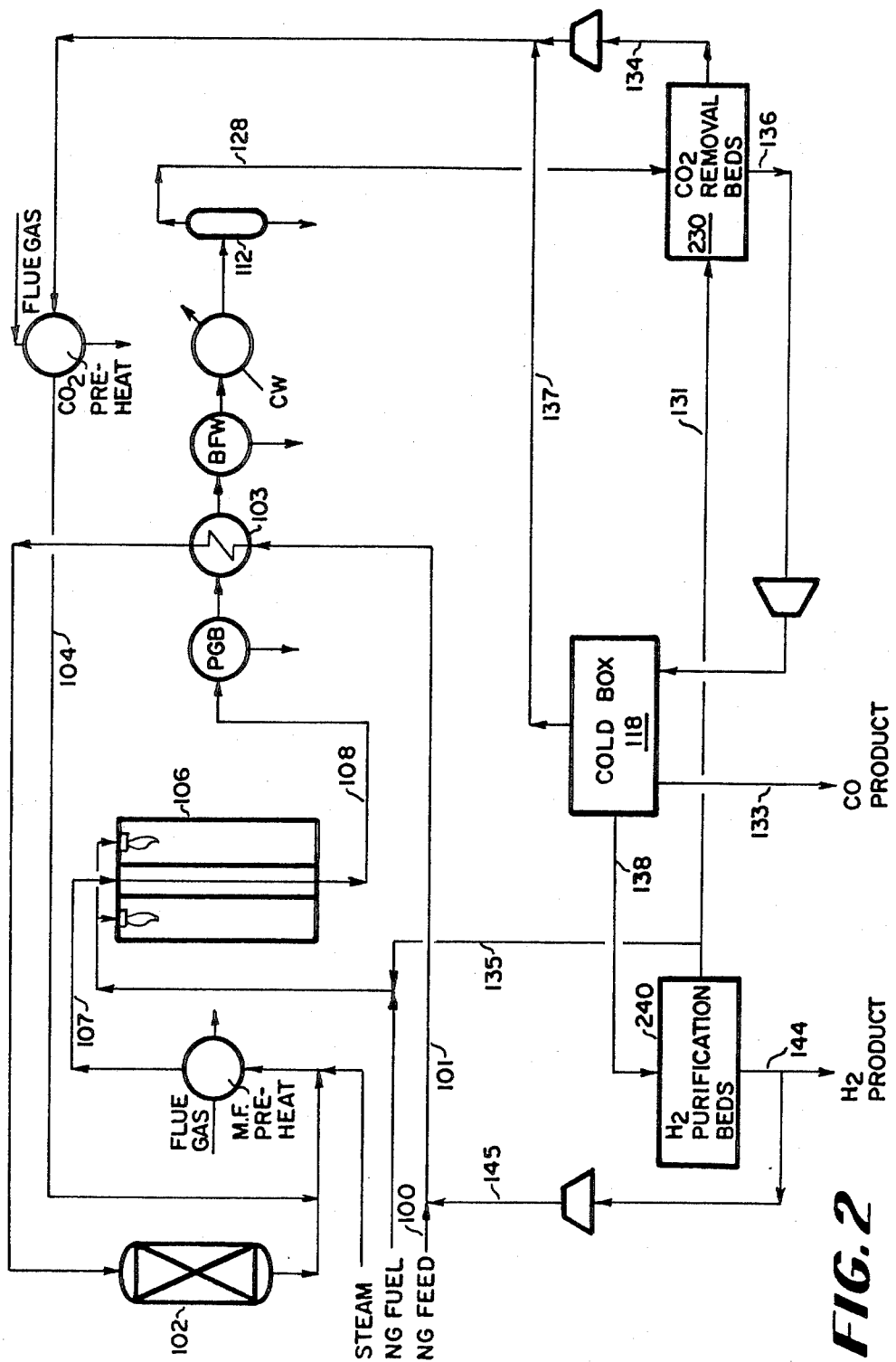
FIGS. 2, 3 and 4 are process flow diagrams for such production and recovery of hydrogen and carbon monoxide by alternative embodiments in accordance with the present invention.

In the first process embodiment, such as that illustrated in FIG. 2, the natural gas or other methane-rich gas feed supplied by line 100 is mixed with a portion of the pure recycled hydrogen product, and the thus mixed gas stream 101 is heated at heat exchanger 103 and then subjected to desulfurization in a known manner at 102 such as by adsorption on carbon or zinc oxide. To the desulfurized gas product there are added process steam and recycled gas comprising predominantly carbon dioxide and hydrogen supplied by line 104. The obtained mixture is preheated and introduced into reforming furnace 106 via line 107. Furnace 106 is a typical steam-hydrocarbon catalytic reformer as is known in the prior art using nickel oxide on an alumina support to catalyze the reactions identified above. The reformate discharged through line 108 will generally contain in the order of 45–50% hydrogen, about 15–20% carbon monoxide, 5–10% carbon dioxide, and up to about 2% of residual methane; the remainder being comprised chiefly of water vapor (up to about 30%) and nitrogen (less than about 0.1%).

The reformate from line 108 is passed through several stages of cooling by heat exchange including exchange against feed in 103 and a major portion of the water is thus condensed and removed in vapor-liquid separator 112. The liquid-freed overhead from the separator is passed through line 128 to the PSA section or unit 230 for $CO_2$ removal as will hereinafter appear.

Practically all of the $CO_2$ content of the gas mixture charged to the PSA unit 230 is selectively adsorbed in the adsorbent beds, as well as the residual water. The $CO_2$-laden beds are regenerated by purging the same with reject gas from hydrogen purification, supplied through line 131. The removed $CO_2$ together with the hydrogen purge gas is discharged into line 134, compressed and recycled to the reformer feed. The unadsorbed components passing through the adsorbent beds in unit 230 exit via line 136, are compressed and sent to the coldbox unit 118 for $H_2$/CO separation.

In the coldbox unit there is generated a CO product stream (133) of about 99.5% purity, a crude hydrogen stream (138) and a stream (137) comprised chiefly of CO and $CH_4$. Stream 138 is sent to the PSA section or unit 240 for adsorptive removal of accompanying contaminants from the hydrogen. On regeneration of the contaminant-laden adsorbent beds of 240 a reject gas is obtained, a minor portion of which is mixed into the fuel charged to furnace 106 via line 135 and the bulk (84%) is used to purge the adsorbent in the $CO_2$ removal beds via line 131. The hydrogen (line 144) recovered as product from 240 is of 99.9+ % purity. A small portion of the pure hydrogen product (5-6% of NG feed) is compressed and added via line 145 to the gas feed charged to reforming furnace 106.

The flow rates and compositions for selected key streams in the above-recited first embodiment of the invention are set out in Table 1 below:

methane-rich gas stream supplied to the reformer and in cooling the reformate with removal of formed condensate in separator 112. The composition of the feed stream entering the reformer will differ to some extent in the alternative embodiments as a result of minor differences in the recycle composition added to the fresh charge.

Figure 3:
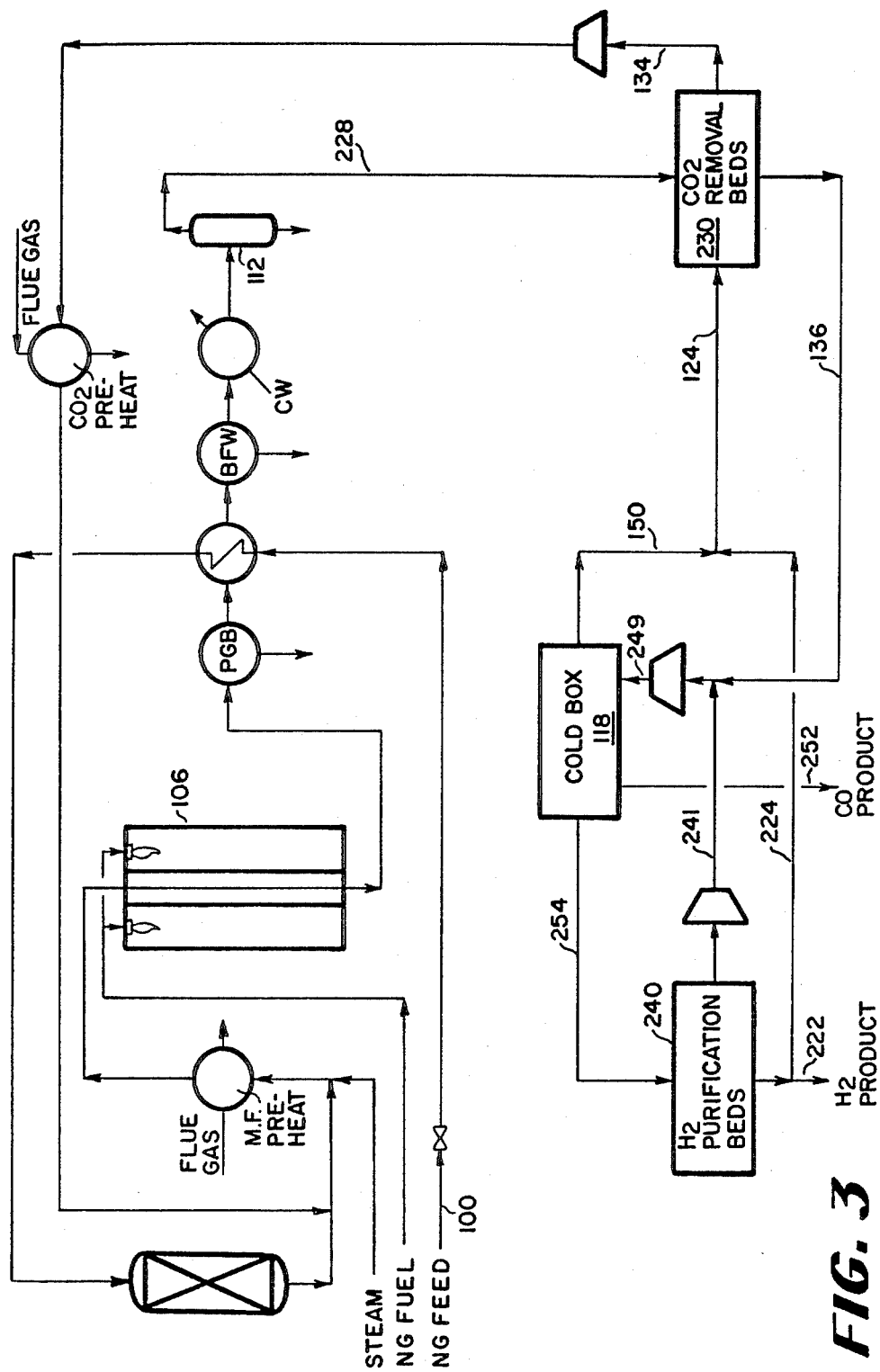

Thus, in the second embodiment, as illustrated in FIG. 3, the pretreatment of the charge, as well as the operation of the reformer and heat recovery sections are the same as that in Process 1. The liquid-freed overhead stream from separator 112 is passed via line 228 into the $CO_2$-adsorbing bed of PSA unit 230, wherein water as well as $CO_2$ are adsorbed. Unsorbed gas in line 136 passing through the PSA adsorbent bed is mixed with reject gas in line 241 from the hydrogen purification bed of section or unit 240, and the mixture compressed to provide the gas feed 249 introduced into coldbox 118. The CO product generated in coldbox 118 (stream 252) is about 99.5% CO purity. The crude hydrogen stream (254) from the coldbox enters the hydrogen purification beds 240 of the PSA section or unit 240, from which a 99.9+ % $H_2$ product (stream 222) is recovered. The reject gas from the $H_2$ beds is compressed and recycled via line 241 to the coldbox feed line 136. A portion of the pure $H_2$ product is combined (via line 224) with the CO/$CH_4$ coldbox effluent (line 150) to form line 124 and used to desorb the $CO_2$-laden beds in 230. The purge gas exiting the $CO_2$ beds via line 134 is compressed to process pressure and recycled to join the fresh desulfurized feed being charged to reformer 106. A fraction of this recycled gas from line 134 may be mixed with the feed gas supplied by line 100 to provide appropriate amounts of hydrogen for desulfurization (as shown for example in FIG. 4).

The flow rates and compositions for selected key

TABLE 1

STREAM FLOW RATES AND COMPOSITIONS FOR SELECTED KEY STREAMS IN PROCESS 1 (FIG. 2)

| STREAM NO. | 101 | 104 | 107 | 108 | 128 | 133 | 134 | 136 | 144 |
|---|---|---|---|---|---|---|---|---|---|
| PRESSURE, PSIA | 340 | 300 | 284 | 255 | 207 | 65 | 35 | 202 | 225 |
| TEMP., °F. | 88 | 820 | 1022 | 1625 | 100 | 99.55 | 94 | 105 | 102 |
| FLOW RATES, # MOL/HR | | | | | | | | | |
| METHANE | 284.34 | 47.36 | 331.70 | 47.72 | 47.72 | .35 | 2.40 | 45.33 | 0.0 |
| ETHANE | 10.11 | 0.0 | 10.11 | 0.0 | 0.0 | 0.0 | 0.0 | 0.0 | 0.0 |
| PROPANE | 1.62 | 0.0 | 1.62 | 0.0 | 0.0 | 0.0 | 0.0 | 0.0 | 0.0 |
| BUTANE | .69 | 0.0 | .69 | 0.0 | 0.0 | 0.0 | 0.0 | 0.0 | 0.0 |
| PENTANE | .27 | 0.0 | .27 | 0.0 | 0.0 | 0.0 | 0.0 | 0.0 | 0.0 |
| HEXANE | .24 | 0.0 | .24 | 0.0 | 0.0 | 0.0 | 0.0 | 0.0 | 0.0 |
| HYDROGEN | 18.0 | 180.18 | 198.18 | 1122.47 | 1122.43 | .09 | 180.18 | 1066.30 | 900.01 |
| CARBON MONOXIDE | 0.0 | 74.97 | 74.97 | 391.55 | 391.51 | 314.47 | 30.04 | 371.94 | 0.0 |
| CARBON DIOXIDE | 2.56 | 199.73 | 202.19 | 200.27 | 199.73 | 0.0 | 199.73 | 0.0 | 0.0 |
| NITROGEN | 1.14 | 0.24 | 1.42 | 1.42 | 1.42 | 1.11 | .24 | 1.34 | 0.0 |
| WATER | 0.0 | 8.49 | 1043.20 | 730.48 | 8.49 | 0.0 | 8.49 | 0.0 | 0.0 |
| SULFUR | <5 ppm | 0.0 | 0.0 | 0.0 | 0.0 | 0.0 | 0.0 | 0.0 | 0.0 |
| TOTAL FLOW, # MOL/HR | 318.97 | 510.97 | 1864.60 | 2493.89 | 1771.29 | 316.02 | 421.07 | 1484.92 | 900.01 |

In the alternative modifications of the invention as hereinafter described, the same procedure is essentially employed in the pretreatment of natural gas or other streams in the above-recited second embodiment of the invention are set out in Table 2 below:

TABLE 2

STREAM FLOW RATES AND COMPOSITIONS FOR SELECTED KEY STREAMS IN PROCESS 2 (FIG. 3)

| STREAM NUMBER | 124 | 222 | 228 | 249 | 252 | 254 |
|---|---|---|---|---|---|---|
| PRESSURE, PSIA | 305 | 220 | 238 | 535 | 65 | 535 |

TABLE 2-continued
STREAM FLOW RATES AND COMPOSITIONS
FOR SELECTED KEY STREAMS IN PROCESS 2 (FIG. 3)

| STREAM NUMBER | 124 | 222 | 228 | 249 | 252 | 254 |
|---|---|---|---|---|---|---|
| TEMPERATURE, °F. | 61.3 | 104 | 100 | 100 | 100 | 104 |
| FLOW RATES, # MOL/HR | | | | | | |
| METHANE | 37.95 | 0.0 | 40.24 | 38.26 | .28 | .03 |
| HYDROGEN | 60.0 | 906.01 | 1017.84 | 1121.96 | 0.0 | 1121.96 |
| CARBON MONOXIDE | 37.95 | 0.0 | 366.94 | 368.36 | 311.45 | 18.96 |
| CARBON DIOXIDE | 0.0 | 0.0 | 204.03 | 0.0 | 0.0 | 0.0 |
| NITROGEN | .13 | 0.0 | 1.32 | 1.28 | 1.12 | .02 |
| WATER | 0.0 | 0.0 | 0.0 | 0.0 | 0.0 | 0.0 |
| TOTAL FLOW, # MOL/HR | 136.03 | 906.01 | 1630.37 | 1529.86 | 312.85 | 1140.98 |

Figure 4:
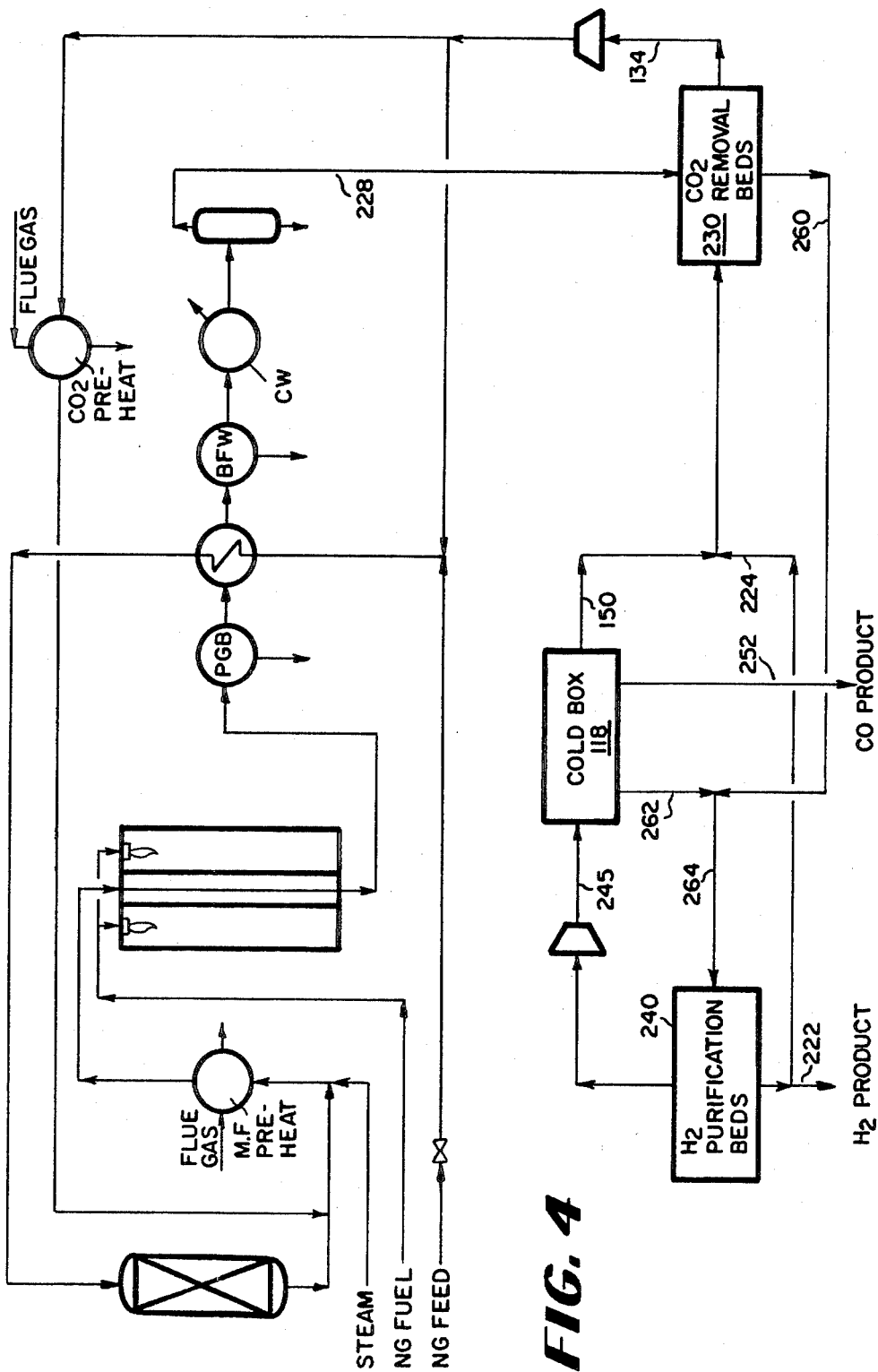

The third alternative embodiment of the invention is illustrated by the flow diagram in FIG. 4. As seen in FIG. 4, the reforming and heat recovery section of this third embodiment is a duplicate of that in the second embodiment (FIG. 3). The cooled syngas (stream 228) enters a $CO_2$-adsorbing bed of the PSA section 230 which is operated under substantially the same conditions as those employed in the previously described embodiments and drawings. The unadsorbed effluent gas in line 260 from 230, freed of water and $CO_2$, is mixed with coldbox hydrogen in line 262 (second reject fraction) and the mixture in line 264 is subjected to purification in PSA section 240, producing a high purity $H_2$ product (stream 222). The reject gas from the $H_2$ purification beds of section 240 is compressed and fed to the coldbox (stream 245). A CO product of high purity (stream 252) is generated and discharged from coldbox 118. Some of the $H_2$ product from beds 240 is withdrawn via line 224 and is used, together with the $CO/CH_4$ effluent (first reject gas fraction) leaving the coldbox via line 150, to pure the $CO_2$ removal beds of the PSA unit 230. The purge gas containing the desorbed $CO_2$ (line 134) is compressed, reheated and at least a portion recycled for admixture with the desulfurized fresh feed charged to the reformer, optionally part of the compressed gas from line 134 is combined with the fresh NG feed being charged to desulfurization at 102.

The flow rates and compositions for selected key streams in the third embodiment of the invention are set out in Table 3 below:

TABLE 3
STREAM FLOW RATES AND COMPOSITIONS
FOR SELECTED KEY STREAMS IN PROCESS 3 (FIG. 4)

| STREAM NUMBER | 222 | 228 | 245 | 252 |
|---|---|---|---|---|
| PRESSURE, PSIA | 220 | 238 | 535 | 65 |
| TEMPERATURE, °F. | 100 | 100 | 100 | 100 |
| FLOW RATES, # MOL/HR | | | | |
| METHANE | 0.0 | 40.24 | 38.26 | .28 |
| HYDROGEN | 906.0 | 1017.82 | 155.95 | 0.0 |
| CARBON MONOXIDE | 0.0 | 366.94 | 368.35 | 311.44 |
| CARBON DIOXIDE | 0.0 | 197.19 | 0.0 | 0.0 |
| NITROGEN | 0.0 | 1.32 | 1.28 | 1.12 |
| WATER | 0.0 | 6.85 | 0.0 | 0.0 |
| TOTAL FLOW, # MOL/HR | 906.0 | 1630.36 | 536.84 | 312.84 |

The three alternative embodiment are all similar in that they use two pressure swing adsorption systems (PSA) integrated with a cold box. The first PSA system, 230, produces a dry $CO_2$-free syngas effluent from a raw syngas feed by adsorption of $CO_2$ and $H_2O$. The second PSA system, 240, produces high purity $H_2$ (99.9+ %) from a syngas stream by adsorption of CO.

Both PSA systems (230 and 240) operate on the principle that impurities are adsorbed at a high pressure and desorbed at a lower pressure using a sweep gas comprised of the unadsorbed component(s). Typically, a PSA operates as a self-regenerating process because the sweep gas comes from either the PSA product effluent or from the void space gas in another adsorbent column. PSA system 240 operates in such a fashion, that is, the adsorbent is regenerated by void space gas from another column, examples of which are described in U.S. Pat. Nos. 3,986,849 and 3,564,816 hereby incorporated herein by reference.

PSA system 230 operates differently from PSA system 240 in that the sweep gas is externally supplied. The sweep gas can be (1) the low pressure purge gas from 240 containing $H_2$ and CO, or (2) cold box 118 reject ($CO/CH_4$), or (3) a portion of $H_2$ product from 240; or any combination of (1), (2) and (3).

The use of an externally supplied regeneration sweep gas is described by U.S. Pat. No. 4,375,363, hereby incorporated herein by reference, in which $N_2$ is used to regenerate the PSA beds. The only difference is that the beds in 230 are regenerated by $CO/CH_4$ and/or $H_2/CO$. System 230 can operate in the way described in U.S. Pat. No. 4,375,363, or according to the six bed cycle described below.

Figure 5:
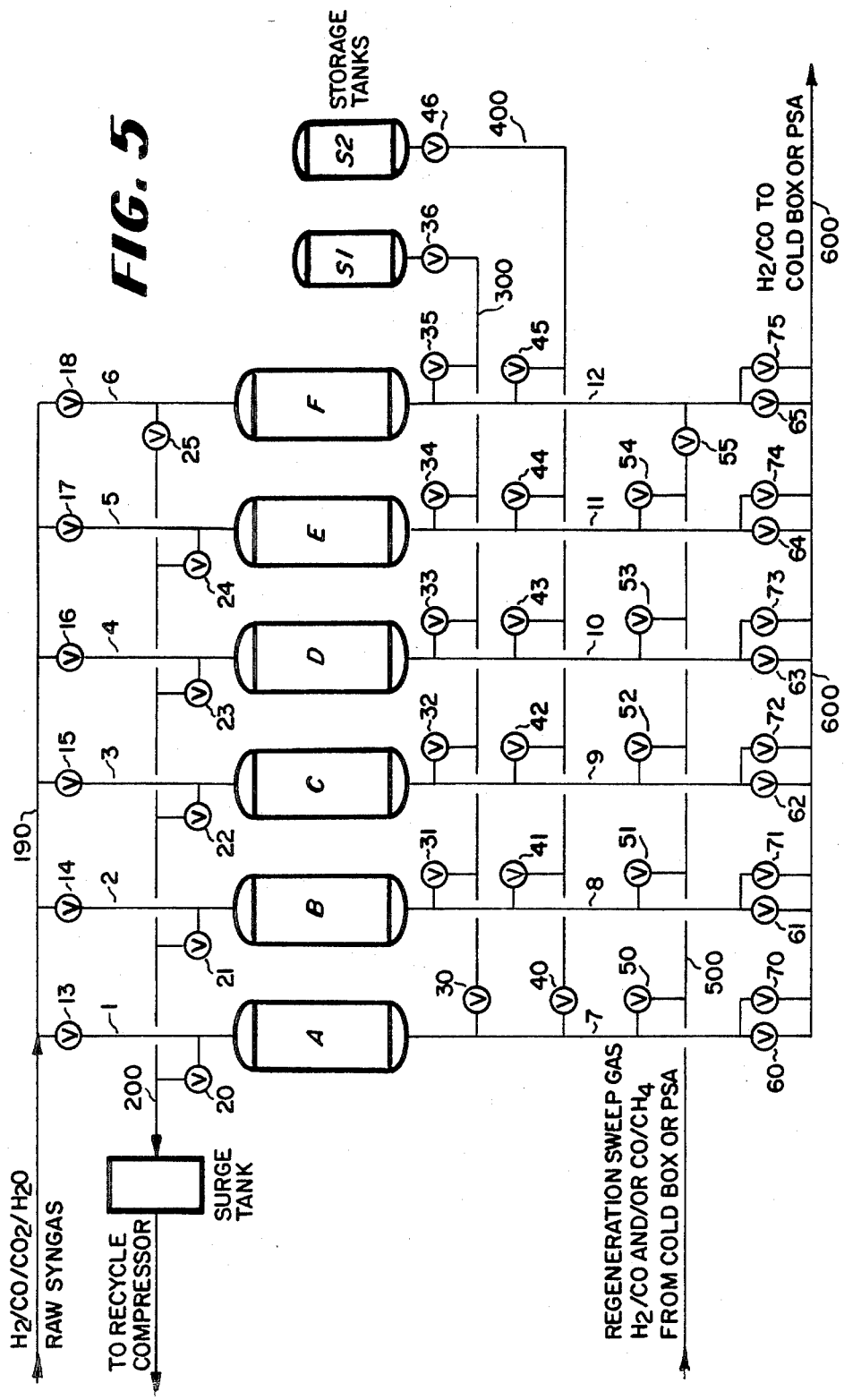
FIG. 5 is a partial process flow diagram of a preferred PSA system for practice of the invention, wherein a six column section is provided for $CO_2$ sorption.

An example of the PSA system 230 is shown in FIG. 5. Some features of this six column process cycle are:

(a) Two columns concurrently undergoing adsorption
(b) Externally supplied sweep gas
(c) Four equalizations
(d) Two storage tanks for holding equalization gas Feature (a):

Two columns undergoing adsorption at the same time allows the use of smaller diameter vessels—as compared to only one vessel on-stream.

Having two or more columns on-stream allows the process cycle to become staggered with respect to time, thereby opening-up "windows" in which an equalization with another adsorbent column (or storage vessel) can occur.

Feature (b):

As discussed above, the sweep gas that regenerates the adsorbent is externally supplied. Since PSA system 230 adsorbs $CO_2$ and $H_2O$, it is essential that the sweep not contain these components. The purge gas from PSA system 240 contains primarily $H_2$ and CO; the cold box reject contains mostly CO and $CH_4$; and the product from PSA system 240 is high purity $H_2$; all of which are $CO_2$- and $H_2O$-free.

Feature (c):

Equalizations between adsorbent columns allows for recovery of non-adsorbed void space gas. The more equalizations, the higher the recovery.

Typically, feed to a column is stopped when the adsorption front is somewhat short of the end of the bed, leaving that portion of the bed unused. During an equalization step, gas is removed from the bed in a direction co-current to the feed with a subsequent drop in pressure. Since adsorption is a function of pressure, i.e. the higher the pressure, the greater the capacity, the pressure drop will cause some of the sorbed species to desorb, only to be adsorbed again on the unused portion of the bed. Providing enough of the unused bed when designing a PSA is critical because none of the adsorbed species must be allowed to contaminate the equalization gas.

Feature (d):

Two storage tanks are used to hold equalization gas from an adsorbent column. The two storage tanks are empty vessels and provide for two additional equalization steps.

The storage tanks are necessary because two "windows" in the process cycle time sequence did not allow any more equalization between adsorbent columns.

The addition of the equalization gas storage tanks are the result of a trade-off between increasing the number of beds and reducing capital cost. U.S. Pat. No. 4,375,363 shows examples of ten bed PSA systems having up to four equalization steps. Using a six bed system with two storage tanks provides an attractive alternative to adding more adsorbent beds because fewer vessels and associated valves would be needed.

The PSA cycle sequence shown in Table 4 operates in the following manner. Raw syngas containing $H_2$, CO, $CO_2$, $H_2O$ and $CH_4$ enters the PSA system by pipe manifold 190 as shown in FIG. 5. $CO_2$- and $H_2O$-free syngas exits the PSA by manifold 600 and is sent to the cold box (first and second embodiments) or to PSA system 240 first (third embodiment). Regeneration gas from the cold box 118 and/or PSA system 240 enters the process via manifold pipe 500. At the start (time unit 1) of the PSA cycle the raw syngas enters adsorbent columns A and B through valves 13, 14 located in lines 1 and 2, with $CO_2$- and $H_2O$-free syngas exiting columns A and B through lines 7 and 8 and is collected in line 600 via valves 60 and 61. During this period, columns C, D, and E and F are undergoing equalizations, regeneration, depressurizations or repressurations in which valves 15 through 18, and 62 through 65 are closed.

Since all the columns operate in an identical fashion, this discussion will focus on the operation of column A. At the end of the adsorption step for column A (after time unit 8), column A is isolated by closing valves 13 and 60. At the same time column C comes on-stream by opening valves 15 and 62. Column A now undergoes a series of four equalizations-depressurizations in a direction co-current to the feed direction to recover trapped void space gas by sending it to another column or to the storage tanks S1 and S2 via lines 300 and 400 respectively. Each equalization step lasts one time unit. The first equalization takes place with storage tank S1, which holds the gas until a "window" opens up in the timing sequence when another column is ready to receive the gas (in this case column D). The second equalization (time unit 10) takes place with column D. The third with storage tank S2 (time unit 11) and the fourth (time unit 12) with column E. During the equalizations, the columns and storage tanks are connected by lines 300 and 400.

After the fourth equalization (time unit 13), the column undergoes a depressurization in a direction countercurrent to the feed direction because the adsorption front is near the end of the bed. This depressurization step is sometimes referred as the blow-down step. Depressurization gas exits column A through valve 20 via line 1 and passes into line 200. The depressurization gas containing $CO_2$ is sent to a surge tank and recovered for cycle back to the reformer. The surge tank helps to provide a uniform concentration. The PSA system 230 losses occur during this step because the remaining void space gas containing $H_2$ and CO is lost. Also there is some loss associated with co-sorption of CO with the $CO_2$, but it is a minor amount compared to the void space gas.

During the depressurization step much of the sorbed $CO_2$ and $H_2O$ is desorbed, but the bed is only partially regenerated. The externally supplied sweep gas, which is $CO_2$- and $H_2O$-free, completes the regeneration of the bed by providing a low $CO_2$ and $H_2O$ partial pressure for desorption.

The regeneration sweep gas enters the PSA by line 500, passes into line 7 via valve 50 and exits Column A with desorbed $CO_2$ and $H_2O$ through line 1. This gas then passes through valve 20 into line 200 and is collected in the surge tank for recycle to the reformer.

Note that the regeneration step lasts for six time units and that for the first and last two time units of this step two columns are being regenerated with sweep gas. This overlap is a result of "windows" appearing in the timing sequence of the cycle. However, this overlap has a beneficial effect in that since the concentration of desorbed gas varies during the depressurization and regeneration steps (i.e. more $CO_2$ is desorbed initially), the concentration of the $CO_2$ exiting the PSA becomes progressively lower. As one bed begins the regeneration step, the other is just ending it.

Once column A has been regenerated, it is ready to be repressurized with equalization gas from the other columns and storage tanks. The first equalization-repressurization takes place with Column C (Column C is in its last equalization-depressurization step just before blow-down). The second equalization-repressurization step takes place with storage tank S2. The third equalization-repressurization step occurs with column D, and the fourth occurs with storage tank S1. Column A now undergoes a final repressurization using effluent syngas which enters the column via line 7 through valve 70. After the final repressurization with syngas effluent, Column A is now ready to go on-stream and the cycle repeats.

It is necessary to discuss some of the features of PSA system 240 since it is supplying some or all of the regeneration gas to PSA system 230. U.S. Pat. No. 3,986,849 herein incorporated by reference describes the operation of a PSA system with two or more adsorbent columns onstream at the same time. Also, two or more columns undergo regeneration concurrently. Since two or more columns are being regenerated at the same time, a relatively steady flow of PSA purge gas is guaranteed for use by PSA system 230 as regeneration sweep gas, as compared to other PSA processes with other intermittent regeneration flows.

This process differs significantly from prior art U.S. Pat. No. 3,838,553 that describes PSA/Cold Box and Cold Box/PSA processes. All the PSA/Cold Box and Cold Box/PSA cycles of the patent feature recovery of the PSA purge gas as a feed to the cold box. The major differences introduced by the present invention are as follows:

(1) Two PSA's are used: PSA/PSA/Cold Box and PSA/Cold Box/PSA combination;

(2) The first PSA produces $CO_2$- and $H_2O$-free syngas (sorption of $CO_2$ and $H_2O$);

(3) The second PSA produces high purity $H_2$ (sorption of CO);

(4) The Cold Box produces high purity CO and a $H_2$/CO stream; and (5) The first PSA is regenerated by $CO_2$- and $H_2O$-free gas from either the second PSA and/or the Cold Box reject; the purge from the second PSA and the cold box reject are utilized at low pressure as a regeneration sweep gas in the first PSA.

The PSA/PSA/Cold Box and PSA/Cold Box/PSA combinations are interdependent because of the recycle streams, and are not simply one unit operation placed in front of the other.

The valve positions for PSA 230 are set forth in Table 5 and the valves correspond to those shown in FIG. 5.

TABLE 4

| TIME UNIT | COLUMN A | B | C | D | E | F | STORAGE TANK S1 | S2 |
|---|---|---|---|---|---|---|---|---|
| 1 | Ads | ERP3 | P | DP | EDP1 | Ads | Store | Release |
| 2 | " | ERP2 | " | P | EDP2 | " | Hold | Hold |
| 3 | " | ERP1 | " | " | EDP3 | " | Release | Store |
| 4 | " | RP | ERP4 | " | EDP4 | " | Hold | Hold |
| 5 | " | Ads | ERP3 | " | DP | EDP1 | Store | Release |
| 6 | " | " | ERP2 | " | P | EDP2 | Hold | Hold |
| 7 | " | " | ERP1 | " | " | EDP3 | Release | Store |
| 8 | " | " | RP | ERP4 | " | EDP4 | Hold | Hold |
| 9 | EDP1 | " | ADS | ERP3 | " | DP | Store | Release |
| 10 | EDP2 | " | " | ERP2 | " | P | Hold | Hold |
| 11 | EDP3 | " | " | ERP1 | " | " | Release | Store |
| 12 | EDP4 | " | " | RP | ERP4 | " | Hold | Hold |
| 13 | DP | EDP1 | " | Ads | ERP3 | " | Store | Release |
| 14 | P | EDP2 | " | " | ERP2 | " | Hold | Hold |
| 15 | " | EDP3 | " | " | ERP1 | " | Release | Store |
| 16 | " | EDP4 | " | " | RP | ERP4 | Hold | Hold |
| 17 | " | DP | EDP1 | " | Ads | ERP3 | Store | Release |
| 18 | " | P | EDP2 | " | " | ERP2 | Hold | Hold |
| 19 | " | " | EDP3 | " | " | ERP1 | Release | Store |
| 20 | ERP4 | " | EDP4 | " | " | RP | Hold | Hold |
| 21 | ERP3 | " | DP | EDP1 | " | Ads | Store | Release |
| 22 | ERP2 | " | P | EDP2 | " | " | Hold | Hold |
| 23 | ERP1 | " | " | EDP3 | " | " | Release | Store |
| 24 | RP | ERP4 | " | EDP4 | " | " | Hold | Hold |

Ads → Adsorb $CO_2$ and $H_2O$ from Syngas feed
EDP # → Equalization depressurization step #; # = 1, 2, 3, 4
ERP # → Equalization repressurization step #; # = 1, 2, 3, 4
DP → Depressurization countercurrent to feed direction
P → Purge Bed; Using regeneration sweep gas
RP → Repressurize

TABLE 5

Valve Position FIG. 5
Valve Position (0 = Open; otherwise closed)

| Time Unit | 13 | 14 | 15 | 16 | 17 | 18 | 20 | 21 | 22 | 23 | 24 | 25 | 30 | 31 | 32 | 33 | 34 | 35 | 36 | 40 | 41 | 42 |
|---|---|---|---|---|---|---|---|---|---|---|---|---|---|---|---|---|---|---|---|---|---|---|
| 1 | 0 | | | | | 0 | | 0 | 0 | | | | | | | | 0 | | 0 | 0 | | |
| 2 | 0 | | | | | 0 | | 0 | 0 | | | | | 0 | | | 0 | | | | | |
| 3 | 0 | | | | | 0 | | 0 | 0 | | | | | 0 | | | | | 0 | | | |
| 4 | 0 | | | | | 0 | | | | | 0 | | | | | | | | | | | 0 |
| 5 | 0 | 0 | | | | | | | 0 | 0 | | | | | | | | 0 | 0 | | | 0 |
| 6 | 0 | 0 | | | | | | | 0 | 0 | | | | | 0 | | | 0 | | | | |
| 7 | 0 | 0 | | | | | | | 0 | 0 | | | | | 0 | | | | 0 | | | |
| 8 | 0 | 0 | | | | | | | | 0 | | | | | | | | | | | | |
| 9 | | 0 | 0 | | | | | | | 0 | 0 | 0 | | | | | | | 0 | | | |
| 10 | | 0 | 0 | | | | | | | 0 | 0 | 0 | | | | 0 | | | | | | |
| 11 | | 0 | 0 | | | | | | | 0 | 0 | | | | | 0 | | | 0 | 0 | | |
| 12 | | 0 | 0 | | | | | | | | 0 | | | | | | | | | 0 | | |
| 13 | | | 0 | 0 | | | 0 | | | | 0 | 0 | | 0 | | | | | 0 | | | |
| 14 | | | 0 | 0 | | | 0 | | | | 0 | 0 | | | 0 | | | | | | | |
| 15 | | | 0 | 0 | | | 0 | | | | 0 | | | | 0 | | | 0 | 0 | | | |
| 16 | | | 0 | 0 | | | 0 | | | | 0 | | | | | | | | 0 | | | |
| 17 | | | | 0 | 0 | | 0 | 0 | | | | | | 0 | | | | | 0 | | | |
| 18 | | | | 0 | 0 | | 0 | 0 | | | | | | | 0 | | 0 | | | | | |
| 19 | | | | 0 | 0 | | 0 | 0 | | | | | | | | | 0 | 0 | | | | 0 |
| 20 | | | | 0 | 0 | | | 0 | | | | | | | | | | | | 0 | | 0 |
| 21 | | | | | 0 | 0 | | 0 | 0 | | | | | | | 0 | | | 0 | 0 | | |
| 22 | | | | | 0 | 0 | | 0 | 0 | | | 0 | | | 0 | | | | | | | |
| 23 | | | | | 0 | 0 | | 0 | 0 | | | 0 | | | | | | 0 | | | | |
| 24 | | | | | 0 | 0 | | 0 | | | | | | | | | | | | | 0 | |

| Time | VALVE NUMBER |
|---|---|

TABLE 5-continued

Valve Position FIG. 5
Valve Position (0 = Open; otherwise closed)

| Unit | 43 | 44 | 45 | 46 | 50 | 51 | 52 | 53 | 54 | 55 | 60 | 61 | 62 | 63 | 64 | 65 | 70 | 71 | 72 | 73 | 74 | 75 |
|------|----|----|----|----|----|----|----|----|----|----|----|----|----|----|----|----|----|----|----|----|----|----|
| 1    |    |    | 0  |    |    |    | 0  |    |    | 0  |    |    |    |    | 0  |    |    |    |    |    |    |    |
| 2    |    | 0  |    |    |    |    | 0  | 0  |    | 0  |    |    |    |    | 0  |    |    |    |    |    |    |    |
| 3    |    | 0  | 0  |    |    |    | 0  | 0  |    | 0  |    |    |    |    | 0  |    |    |    |    |    |    |    |
| 4    |    | 0  |    |    |    |    | 0  |    |    | 0  |    |    |    |    | 0  |    | 0  |    |    |    |    |    |
| 5    |    |    | 0  |    |    |    | 0  |    |    | 0  | 0  |    |    |    |    |    |    |    |    |    |    |    |
| 6    |    |    |    |    |    |    |    | 0  | 0  | 0  | 0  |    |    |    |    |    |    |    |    |    |    |    |
| 7    |    | 0  | 0  |    |    |    |    | 0  | 0  | 0  | 0  |    |    |    |    |    |    |    |    |    |    |    |
| 8    | 0  | 0  |    |    |    |    | 0  |    |    | 0  | 0  |    |    |    |    |    |    |    | 0  |    |    |    |
| 9    | 0  |    | 0  |    |    |    |    |    |    |    | 0  | 0  |    |    |    |    |    |    |    |    |    |    |
| 10   |    |    |    |    |    |    |    | 0  | 0  |    | 0  | 0  |    |    |    |    |    |    |    |    |    |    |
| 11   |    |    | 0  |    |    |    |    | 0  | 0  |    | 0  | 0  |    |    |    |    |    |    |    |    |    |    |
| 12   |    | 0  |    |    |    |    | 0  |    |    |    | 0  | 0  |    |    |    |    |    |    |    | 0  |    |    |
| 13   |    | 0  |    | 0  |    |    | 0  |    |    |    |    |    | 0  | 0  |    |    |    |    |    |    |    |    |
| 14   |    |    |    | 0  |    |    | 0  |    |    |    |    |    | 0  | 0  |    |    |    |    |    |    |    |    |
| 15   |    |    | 0  | 0  |    |    | 0  |    |    |    |    |    | 0  | 0  |    |    |    |    |    |    |    |    |
| 16   |    | 0  |    | 0  |    |    |    |    |    |    |    |    | 0  | 0  |    |    |    |    |    | 0  |    |    |
| 17   |    | 0  | 0  | 0  |    |    |    |    |    |    |    |    |    |    | 0  | 0  |    |    |    |    |    |    |
| 18   |    |    |    |    | 0  | 0  |    |    |    |    |    |    |    |    | 0  | 0  |    |    |    |    |    |    |
| 19   |    |    | 0  | 0  | 0  |    |    |    |    |    |    |    |    |    | 0  | 0  |    |    |    |    |    |    |
| 20   |    |    |    |    | 0  |    |    |    |    |    |    |    |    |    | 0  | 0  |    |    |    |    |    | 0  |
| 21   |    |    | 0  |    | 0  |    |    |    |    |    |    |    |    |    | 0  | 0  |    |    |    |    |    |    |
| 22   |    |    |    | 0  | 0  |    |    |    |    |    |    |    |    |    | 0  | 0  |    |    |    |    |    |    |
| 23   | 0  |    | 0  |    | 0  | 0  |    |    |    | *  |    |    |    |    | 0  | 0  |    |    |    |    |    |    |
| 24   | 0  |    |    |    |    | 0  |    |    |    |    |    |    |    |    | 0  | 0  | 0  |    |    |    |    |    |

Figure 6:
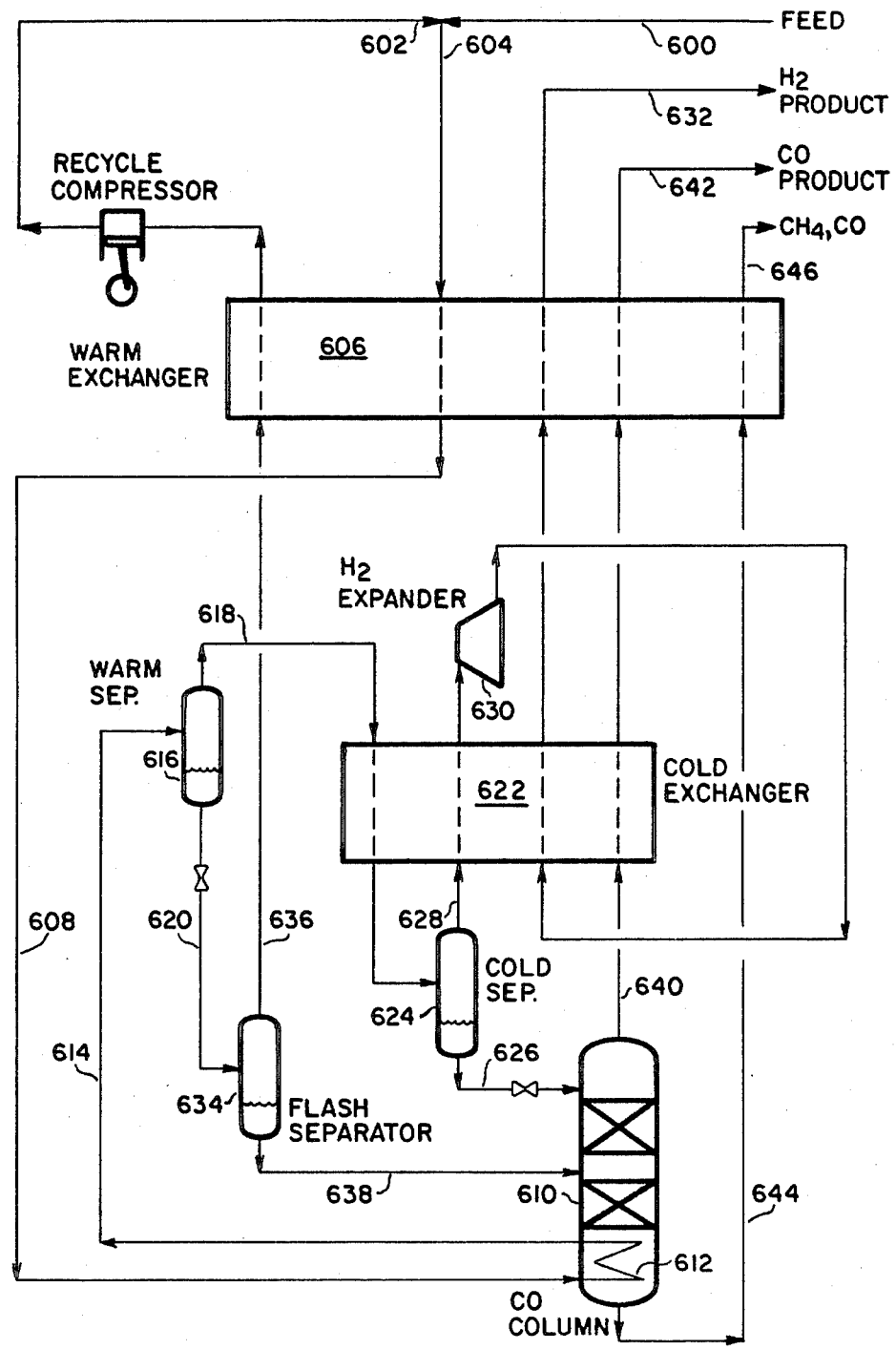
FIG. 6 is a largely diagrammatic partial view of a coldbox unit for cryogenic fractionation, that may be used for condensation of carbon monoxide from its admixture with hydrogen and minor contaminants.

FIG. 6 is a simplified process flow diagram for a partial condensation cryogenic cycle to produce carbon monoxide and hydrogen as would be used for cold box 118. Feed gas 600 and recycle 602 are first cooled as mixed stream 604 against returning product streams in the warm exchanger 606 and further cooled as stream 608 against liquid methane in the carbon monoxide column (610) reboiler 612. This stream (stream 614) then enters a warm separator 616 where condensed carbon monoxide and methane are removed. Vapor 618 from the warm separator 616 is further cooled in the cold exchanger 622 where the remaining carbon monoxide is condensed. The liquid 626 from the cold separator 624, a high purity carbon monoxide stream, enters the carbon monoxide column 610 and is used as reflux. Hydrogen vapor 628 from the cold separator 624 is warmed in the cold exchanger 622, expanded in turbine 630, rewarmed in the cold exchanger 622, and further warmed in the warm exchanger 606 where it exits the coldbox as stream 632 with a purity of 97 to 98% (line 632).

The liquid 620 from the warm separator 616 is flashed into the flash separator 634 where dissolved hydrogen is removed. The vapor 636 leaving the flash separator 634 is warmed in the warm exchanger 606, compressed and recycled as stream 602 to the feed stream 600. The liquid 638 leaving the flash separator 634 is fed to the carbon monoxide column 610 where the carbon monoxide and methane are distilled. The column vapor stream 640 constitutes the carbon monoxide product 642. The 610 column liquid bottoms stream 644, containing methane and carbon monoxide, is vaporized in the warm exchanger 606 and removed as product in line 646.

In each of the described embodiments of the invention pressure swing adsorption is employed in combination with a coldbox instead of the prior art systems wherein solvent extraction is employed in combination with a coldbox and a subsequent pressure swing adsorption scheme for separation of components from a synthesis gas comprised chiefly of hydrogen, CO and $CO_2$. By each of the several illustrated modifications for practice of the invention significant savings in both capital and energy requirements are realized with consequent lower product purification costs. In these described embodiments of the invention the front end steam reforming sections can be largely similar to the described "state of the art" technology. Thus, the mixed feed preheat temperature in the range of 750° to 1050° F. (preferably about 1022° F.) and the reformer effluent conditions of 1350° to 1700° F. (preferably about 1625° F.) at a pressure in the range of 100 to 450 PSIA (preferably about 225 PSIA) may be the same in practice of the invention as conditions generally employed in the conventional technology. However, since in the processes of the invention solvent extraction of $CO_2$ is not used, there is no need of MEA reboilers, so that the heat recovery section is beneficially modified to recover the larger quantity of waste heat available in the processes according to the invention, and made subject to optimization for maximum steam generation.

By the several described embodiments of the invention there are produced a $H_2$ product stream of 99.9+% purity and a CO product stream of 99.5% purity. By described Processs 2 and 3 essentially 100% of the $H_2$ and CO products are recovered, while by Process 1 a portion of the reject gas from the $H_2$ purification step is sent to fuel.

While the practice of the present invention is hereinbefore described chiefly with reference to its application to a mixed gas stream obtained by steam reforming of a methane-rich charge, it is also applicable to separation of components of mixed gas compositions, such as those obtained by partial oxidation of hydrocarbons as well as those obtained by autothermal hydrocarbon reforming.

What is claimed is:

1. The method for production of high purity hydrogen and high purity carbon monoxide from a mixed gas stream comprising these components together with carbon dioxide and a zero to a minor amount of one or more other gaseous contaminants which method comprises the steps of:

(a) passing said mixed gas stream into and through a first bed of solid adsorbent capable of selectively adsorbing carbon dioxide and water while discharging from said bed a dry $CO_2$-freed effluent;

(b) introducing said dry $CO_2$-freed effluent into a cryogenic environment for cooling the same therein under conditions effective for condensation of at least the major part of the carbon monoxide present in said dry $CO_2$-freed effluent;

(c) withdrawing from said cryogenic environment carbon monoxide of high purity;

(d) separately withdrawing from said cryogenic environment an uncondensed first gas stream product comprised of crude hydrogen and subjecting said first gas stream product to selective adsorption of non-hydrogen components therefrom in a second bed of solid absorbent, while recovering from said second bed the non-sorbed fraction as a product stream of essentially pure hydrogen;

(e) purging said second solid adsorbent bed to desorb non-hydrogen components sorbed therein in step (d), and withdrawing from said bed a gas stream comprising the desorbed non-hydrogen components.

2. The method as defined in claim 1 wherein said dry $CO_2$-freed effluent of step (b) is compressed before introduction into said cryogenic environment.

3. The method as defined in claim 1 wherein said mixed gas stream recited in step (a) is composed chiefly of hydrogen, carbon monoxide and carbon dioxide.

4. The method as defined in claim 3 wherein said mixed gas stream is the product obtained by partial oxidation of hydrocarbons.

5. The method as defined in claim 3 wherein said mixed gas stream is the product obtained by autothermal reforming of hydrocarbons.

6. The method as defined in claim 3 wherein in addition to the carbon monoxide condensate and said crude hydrogen withdrawn from said cryogenic environment, there is also recovered from said environment a third gas stream comprising methane and carbon monoxide, said third gas stream being employed for purging sorbed carbon dioxide and water from said first bed of solid adsorbent.

7. The method as defined in claim 6 wherein said mixed gas stream further contains a minor amount of methane and is the product obtained in steam reforming of a methane-rich charge, and wherein the effluent involved in purging said first bed of solid adsorbent by said third gas stream is compressed and recycled to said steam reforming operation.

8. The method as defined in claim 7 wherein said gas stream employed in purging $CO_2$ from the solid adsorbent bed contains an added portion of the essentially pure hydrogen product recovered during step (d).

9. The method as defined in claim 7 wherein the gas stream comprising the desorbed non-hydrogen components withdrawn from said second adsorbent bed in step (e) is compressed and recycled to said cryogenic environment.

10. The method as defined in claim 3 wherein said mixed gas stream is the product obtained by steam reforming of a methane-rich charge.

11. The method as defined in claim 10 wherein a minor portion of said essentially pure hydrogen recovered in step (d) is compressed and recycled for inclusion with the methane-rich charge subjected to said steam reforming.

12. The method as defined in claim 10 wherein contained carbon dioxide is desorbed from said first bed of solid adsorbent, and the desorbed effluent is compressed and recycled to the steam reforming operation.

13. The method as defined in claim 12 wherein at least part of said stream comprising non-hydrogen components withdrawn from said second adsorbent bed during step (e) is utilized in desorbing contained carbon dioxide from said first adsorbent bed.

14. The method as defined in claim 10 including the step of separately discharging from said cryogenic environment a second gas stream comprised chiefly of carbon monoxide and methane.

15. The method as defined in claim 14 wherein said discharged second gas stream is recycled to the steam reforming operation.

16. The method for production of hydrogen and carbon monoxide, each in essentially pure form, from a mixed gas stream obtained by steam hydrocarbon reforming of a methane-rich charge, said mixed gas stream containing in addition to hydrogen and carbon monoxide together with carbon dioxide as a major component a zero to minor amount of one or more gaseous components from the group consisting of nitrogen, methane, water vapor and $C_2$ to $C_6$ hydrocarbons, which method comprises the steps of initially removing carbon dioxide and water from said mixed gas stream by adsorption in a first bed of solid adsorbent selective in retention of carbon dioxide and water and further treating the obtained carbon dioxide/water-freed effluent from said first adsorbent bed by (1) cryogenic fractionation and (2) further selective adsorption, in either order, under conditions effecting removal from said carbon dioxide/water-freed effluent of contained minor components, thereby recovering the hydrogen and carbon monoxide, each in essentially pure form.

17. The method as defined in claim 16 wherein the carbon dioxide/water-freed effluent withdrawn from said first adsorbent bed is directly introduced into a second adsorbent bed wherein contained components other than hydrogen are selectively sorbed while essentially pure hydrogen passes through the bed and is recovered as product; the sorbed non-hydrogen components are desorbed from said bed, compressed and subjected to cryogenic fractionation under conditions effecting liquefaction of contained carbon monoxide which is then recovered as a high purity product.

18. The method as defined in claim 17 wherein a portion of the recovered essentially pure hydrogen product is used in desorbing the contained carbon dioxide and water from said first adsorbent bed.

19. The method as defined in claim 18 wherein the gas stream obtained during the desorption of carbon dioxide and water from said first adsorbent bed is recycled to said steam hydrocarbon reforming operation.

20. The method as defined in claim 17 wherein said second adsorbent bed is purged to remove contained components sorbed therein, thereby producing a purge effluent, compressing said purge effluent and subjecting the compressed purge effluent to cryogenic fractionation under conditions forming a liquid carbon monoxide fraction of high purity.

21. The method as defined in claim 20 wherein in addition to the high purity carbon monoxide formed there is obtained from said cryogenic fractionation a first reject gas fraction employed in purging sorbed carbon dioxide and water from said first adsorbent bed and a second reject fraction comprised of crude hydrogen, which is further purified in the second adsorbent bed.

22. The method as defined in claim 21 wherein a portion of the hydrogen product from the second adsorbent bed is used to purge the first adsorbent bed.

* * * * *